United States Patent
Handley (10) Patent No.: US 11,800,586 B2
(45) Date of Patent: Oct. 24, 2023

(54) AUTOMATED EQUIPMENT ASSOCIATION SYSTEM

(71) Applicant: Cubic Corporation, San Diego, CA (US)

(72) Inventor: Paul G. Handley, Auckland (NZ)

(73) Assignee: Cubic Corporation, San Diego, CA (US)

( * ) Notice: Subject to any disclaimer, the term of this patent is extended or adjusted under 35 U.S.C. 154(b) by 182 days.

(21) Appl. No.: 17/508,631

(22) Filed: Oct. 22, 2021

(65) Prior Publication Data

US 2022/0132609 A1 Apr. 28, 2022

Related U.S. Application Data

(60) Provisional application No. 63/104,206, filed on Oct. 22, 2020, provisional application No. 63/104,204, filed on Oct. 22, 2020.

(51) Int. Cl.

| H04W 76/15 | (2018.01) |
| H04W 8/00 | (2009.01) |
| H04W 64/00 | (2009.01) |
| F42B 8/26 | (2006.01) |
| G09B 9/00 | (2006.01) |
| H04W 84/10 | (2009.01) |

(52) U.S. Cl.
CPC .......... *H04W 76/15* (2018.02); *F42B 8/26* (2013.01); *G09B 9/003* (2013.01); *H04W 8/005* (2013.01); *H04W 64/006* (2013.01); *H04W 84/10* (2013.01)

(58) Field of Classification Search
CPC ... H04W 76/15; H04W 8/005; H04W 64/006; H04W 84/10; F42B 8/26; G09B 9/003
See application file for complete search history.

(56) References Cited

U.S. PATENT DOCUMENTS

| 2007/0060045 | A1 | 3/2007 | Prautzsch |
| 2014/0178841 | A1 | 6/2014 | Carter |
| 2020/0100115 | A1* | 3/2020 | Skaaksrud ............ H04W 4/38 |
| 2020/0117900 | A1 | 4/2020 | Deng et al. |
| 2021/0173480 | A1* | 6/2021 | Osterhout ............ G06F 3/0227 |

FOREIGN PATENT DOCUMENTS

| EP | 0785406 A2 | 7/1997 |
| WO | 2011-133845 A2 | 10/2011 |

* cited by examiner

*Primary Examiner* — Jianye Wu
(74) *Attorney, Agent, or Firm* — Mughal Gaudry & Franklin PC (57) ABSTRACT

An automatic association system for automating an association of a plurality of devices in a battlefield simulation system. A network polling mode of each of the plurality of devices is initiated. At least one other of the plurality of devices is detected. A movement of the device and the at least one other of the plurality of devices is correlated. A device profile associated with the device is correlated with a movement over time profile of a platform. The device and the at least one other of the plurality of devices are determined to be on the platform based on the movement and the correlation of the device profile with the movement over time profile. The device is authenticated based on the determination and a personal area network between the device and the at least one other of the plurality of devices is established based on the authentication.

20 Claims, 6 Drawing Sheets

AUTOMATED EQUIPMENT ASSOCIATION SYSTEM

CROSS-REFERENCE TO RELATED APPLICATIONS

This application claims the benefit of and is a non-provisional of U.S. Provisional Application Ser. Nos. 63/104,204 and 63/104,206 both filed on Oct. 22, 2020, which are both hereby expressly incorporated by reference in their entirety for all purposes.

This application expressly incorporates by reference U.S. application Ser. No. 17/508,702, filed on Oct. 22, 2021, entitled "GEOMETRICALLY PAIRED LIVE INSTRUMENTATION TRAINING HAND GRENADE" in its entirety for all purposes.

BACKGROUND

This disclosure relates in general to device association systems and, but not by way of limitation, to automating the association of devices appended to a platform. That is, correlating, associating, and authorizing a device for establishing a connection with other devices in a network.

Traditional techniques for establishing personal area networks for a number of network modules include both the connectivity and location of the modules. These traditional techniques typically include manual operation. For example, using a peripheral, such as a mobile device, as an interactive device to illustrate to a user where to place a particular module. For establishing wireless communications using short-range communication protocols such as Zigbee®, Bluetooth, beacon, and similar networks, typically a user must actuate a button to initiate/associate multiple devices. In some applications, an identification number is often required to be input to initial pairing of devices. Other techniques for establishing communication between devices may utilize infrared (IR) media to illuminate and communicate network data. Further, IR media is used to illuminate and communicate network data plus location about the vehicle platform. Some techniques utilize radio received signal strength indication (RSSI), Bluetooth, Bluetooth Low Energy (BLE), IEEE802.15.4 or other short-range communication techniques to determine proximity and to pair devices.

Connecting unauthenticated devices to the network and false positives are some of the other problems associated with the networks. Thus, improvements in network association are desired to eliminate human error, increase ease of use and accuracy of location based association systems.

SUMMARY

In one embodiment, the disclosure provides an automatic association system for automating an association of a plurality of devices in a battlefield simulation system. A network polling mode of each of the plurality of devices is initiated. At least one other of the plurality of devices is detected. A movement of the device and the at least one other of the plurality of devices is correlated. A device profile associated with the device is correlated with a movement over time profile of a platform. The device and the at least one other of the plurality of devices are determined to be on the platform based on the movement and the correlation of the device profile with the movement over time profile. The device is authenticated based on the determination and a personal area network between the device and the at least one other of the plurality of devices is established based on the authentication.

In another embodiment, the disclosure provides a method of automating an association of a plurality of devices in a battlefield simulation system. In one step, the plurality of devices on a platform is provided. A network polling mode of each of the plurality of devices is initiated. Using each of the plurality of devices, at least one other of the plurality of devices is detected. A movement of the device and the at least one other of the plurality of devices is detected using a device of the plurality of devices. The movement of the device is correlated to the movement of the at least one other of the plurality of devices. A device profile associated with the device is correlated with a movement over time profile of the platform. Determination of whether the device and the at least one other of the plurality of devices are on the platform is performed based on the movement and the correlation of the device profile with the movement over time profile. The device is authenticated based on the determination. A personal area network between the device and the at least one other of the plurality of devices is established based on the authenticating and determining that the device and the at least one other of the plurality of devices are on the platform.

In still embodiment, the disclosure provides an automatic association system for connecting a plurality of devices in a network of a battlefield simulation environment. The automatic association system includes a plurality of devices. Each of the plurality of devices includes an inertial measurement unit, a network interface, and a processor. A network polling mode of a device of the plurality of devices is initiated using the network interface. At least one other device of the plurality of devices is detected using the network interface of the device. A movement of the device is detected using the inertial measurement unit. The movement of the device is correlated to a movement of the at least one other of the plurality of devices. A device profile associated with the device is correlated with a movement over time profile of a platform. The device is authenticated based on the determination. A personal area network between the device and the at least one other of the plurality of devices is established using the network interface based on the authentication of the device.

In an embodiment, the disclosure provides software to cause an automatic association system to:
provide a plurality of devices on a platform;
initiate a network polling mode of each of the plurality of devices;
detect, using each of the plurality of devices, at least one other of the plurality of devices;
detect, using a device of the plurality of devices, a movement of the device and a movement of the at least one other of the plurality of devices;
correlate the movement of the device to the movement of the at least one other of the plurality of devices;
determine that a device profile associated with the device correlates with a movement over time profile of the platform;
authenticate the device based on the determination; and
establish a personal area network between the device and the at least one other of the plurality of devices based on the authentication.

Further areas of applicability of the present disclosure will become apparent from the detailed description provided hereinafter. It should be understood that the detailed description and specific examples, while indicating various embodi-

BRIEF DESCRIPTION OF THE DRAWINGS

The present disclosure is described in conjunction with appended figures.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
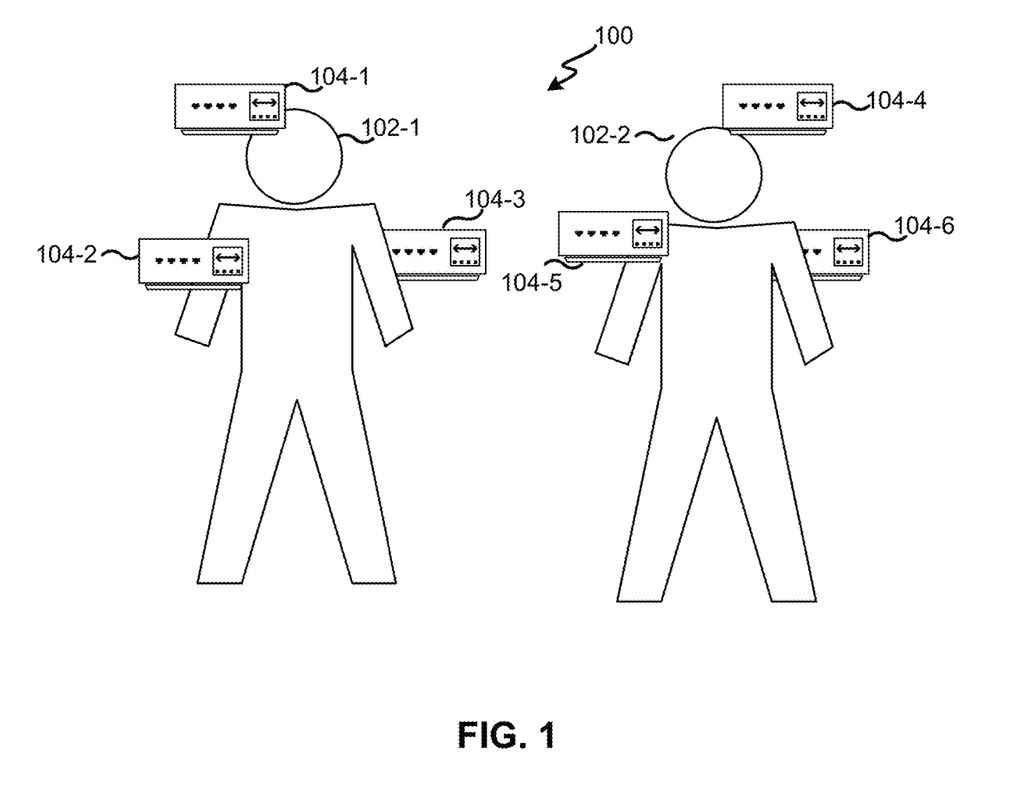
FIG. 1 depicts an embodiment of an automatic association system.

Referring initially to FIG. 1, an embodiment of an automatic association system 100 is illustrated. The automatic association system 100 includes a user 102-1 and a user 102-2 having a number of wireless modules 104 (104-1, 104-2, 104-3, 104-4, 104-5, and 104-6) positioned on their bodies. In an embodiment, each of the wireless modules 104-1, 104-2, 104-3, 104-4, 104-5, and 104-6 may be associated with a weapon effect simulation methodology for use in a combat simulation system, such as multiple integrated laser engagement system (MILES). In another embodiment, each of the wireless modules 104-1, 104-2, 104-3, 104-4, 104-5, and 104-6 may be a laser detector. The wireless modules 104-1, 104-2, 104-3, 104-4, 104-5, and 104-6 are capable of wirelessly communicating with each other in a network using short-range communication protocols and may be positioned at various locations on a user's body. For example, the wireless module 104-1 is positioned on the user's 104-1 head, the wireless modules 104-2 and 104-3 are positioned on chest and back, respectively of the user 102-1. The wireless modules 104-1, 104-2, 104-3, 104-4, 104-5, and 104-6 may be affixed to the user 102-1 and 102-2 through the use of straps, bands, snaps, insertion into pockets of the user's kit (vest, jacket, shirt, pants, belt, helmet, etc.), and/or otherwise affixed to the user 102-1 and the user 102-2. In another embodiment, one or more wireless modules 104-1, 104-2, 104-3, 104-4, 104-5, and 104-6 may be integrated into an existing equipment. For example, one or more wireless modules 104-1, 104-2, 104-3, 104-4, 104-5, and 104-6 may be integrated into a user's 102-1 or user's 102-2 helmet.

The wireless modules 104-1, 104-2, 104-3, 104-4, 104-5, and 104-6 may include an integrated inertial measurement unit (IMU) that is configured to detect movement of the wireless modules 104-1, 104-2, 104-3, 104-4, 104-5, and 104-6 based on detected acceleration, direction (for example, using digital compass), orientation (using gyroscope), pressure signals, and/or other indicators of movement. By way of an example, during movement of the user 102-1, such as walking, an accelerometer of the IMU of each wireless modules 104-1, 104-2, 104-3, 104-4, 104-5, and 104-6 may cross-correlate with one another. Based on this cross-correlation, the wireless modules 104 may determine that the wireless modules 104 are attached to the user 102-1 or the user 102-2. For example, the wireless modules 104 on a particular body may exhibit similar movements, especially those wireless modules 104 positioned on a user's 102-1 chest and back, which essentially form a rigid or semi-rigid body that moves at a consistent rate.

As the wireless module 104-2 on the chest of the user 102-1 moves, the wireless module 104-3 on the back also moves in a similar direction, acceleration, velocity, time, duration, etc. Biomechanical information may be used to map movement of the wireless modules 104-1, 104-2, 104-3, 104-4, 104-5, and 104-6 on different body parts that may move differently during various movements, such as walking. Although generally during movement, such as walking, even wireless module 104-1 on a user's head will experience some similarities in terms of magnitudes of acceleration/velocity and/or timing and/or duration of movements. By detecting other wireless modules 104-1, 104-2, 104-3, 104-4, 104-5, and 104-6 having movement patterns with similar characteristics, the wireless modules 104-1, 104-2, 104-3, 104-4, 104-5, and 104-6 may determine that they are on the same body and associate with one another to form a personal area network.

In another embodiment, the automatic association of any number of, often about five-six, Wireless Personal Area Network (PAN) man-worn instrumentation equipment items worn by a user is established. Further, the automatic association of wireless and wired vehicle instrumentation equipment items of any number of, often about 10-20, fitted to a vehicle is enabled. In another embodiment, the instrumentation equipments may include laser detectors and/or other equipments related to a laser combat training simulation system, such as a multiple integrated laser engagement system (MILES). Laser engagement systems utilize a number of small laser sensors positioned on and/or carried by users. These sensors detect when the user has been illuminated by a firearm's laser transmitter. Each laser transmitter is set to mimic the effective range of the weapon on which it is used, allowing for realistic combat training simulations to be conducted in controlled settings. Laser engagement systems are also usable with vehicle simulations. For example, vehicles may be outfitted with an array of laser sensors or individual wireless detectors. While discussed largely in relation to combat simulation systems, a battlefield simulation environment or a battlefield simulation system, alternative embodiments may vary from the embodiments discussed herein, and alternative applications may exist for example, on taxis, trains, pairing Bluetooth devices, etc.

Any number of network devices, such as laser detectors can detect one another and automatically form a personal area network. Embodiments may incorporate the IMUs into each of the network devices. The IMUs may detect acceleration, direction (e.g., digital compass), orientation, pressure signals, and/or other indicators of movement. Each network device may be programmed to associate with other network devices positioned on a single platform (e.g., a human body, vehicle body, etc.). Using the movement detected by the IMUs, the network devices may determine which other network devices are on the same platform and may automatically associate with one another to establish a personal area network. This enables the network devices to be affixed to a platform and a personal area network to be initialized merely by movement of the platform (walk/drive/fly/swim, etc.) without the need for further user interaction. Platform examples come from ground domain but are transferrable into air and maritime platforms.

The correlation of the movement of the wireless modules 104-1, 104-2, 104-3, 104-4, 104-5, and 104-6 allows to identify cheating among the wireless modules. For example, inferential data on all wireless modules that are solar powered is used such that all the wireless modules experience a level of solar energy and the wireless module(s) reporting none would potentially be a cheat case.

Figure 2:
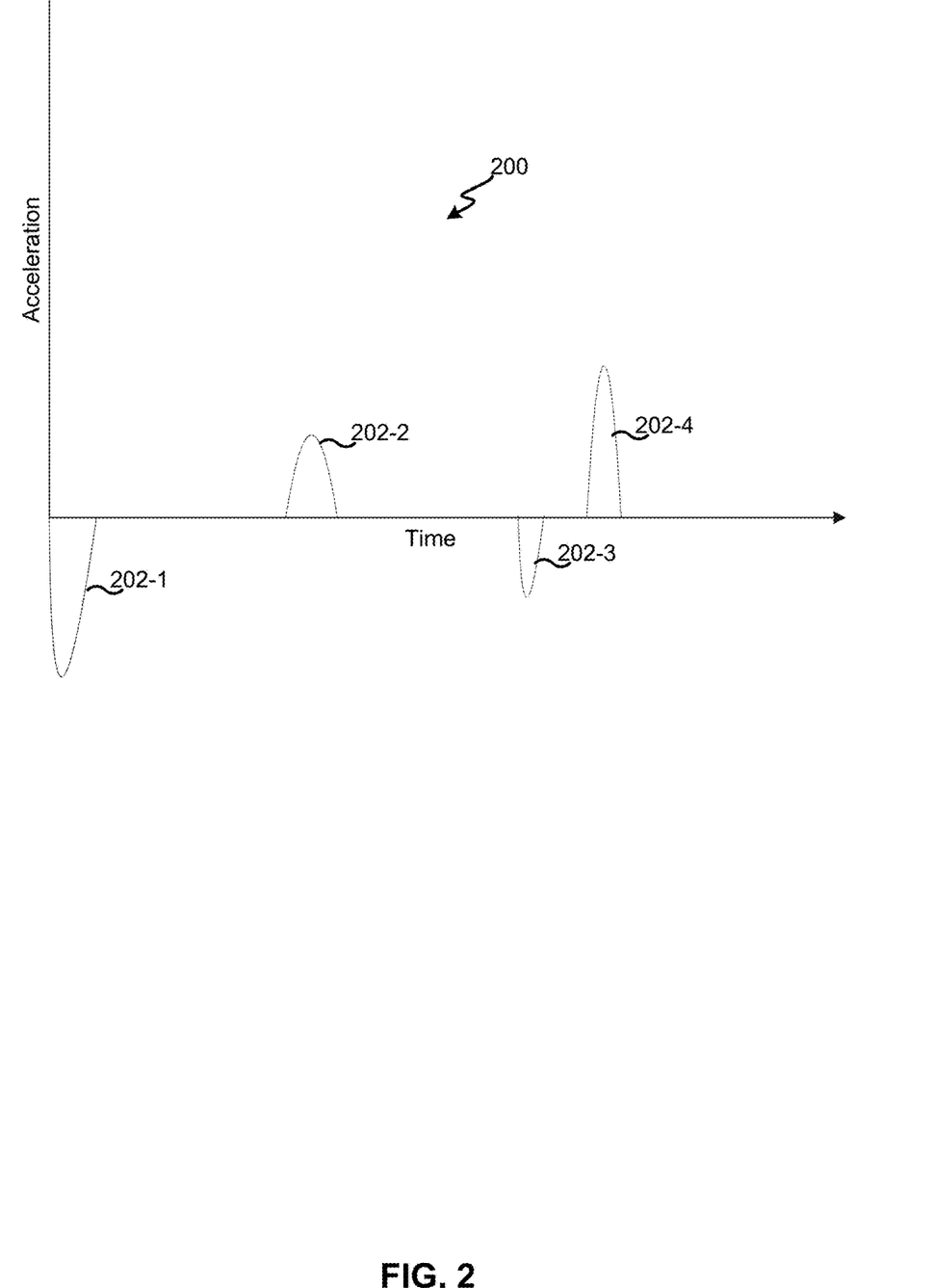
FIG. 2 depicts a timing diagram of a user's acceleration profile associated with the automatic association system.

Referring next to FIG. 2, a timing diagram of a user's acceleration profile 200 associated with the automatic association system 100 is illustrated. The user's acceleration profile 200 is generated by the wireless module 104-1 as the user 102-1 traverses a distance over time. The user's acceleration profile 200 includes spikes 202-1, 202-2, 202-3, and 202-4 that indicate when the user begins moving (accelerates) and stops moving (decelerates). Similar user profiles may be generated by each wireless module 104-1, 104-2, 104-3 on the user 102-1 and characteristics from the profiles may be compared (such as timing of spikes 202-1, 202-2, 202-3, and 202-4, magnitude of spikes 202-1, 202-2, 202-3, and 202-4, direction of spikes 202-1, 202-2, 202-3, and 202-4, and/or other information) to identify which wireless modules 104-1, 104-2, 104-3 are affixed to the same user 102-1. Other embodiments can use other measurements (or combinations thereof) of user 102-1 and module movement as detected by the IMU associated with each module 104-1, 104-2, 104-3.

In some embodiments, the personal area network may have a hub and spoke configuration although other network types such as mesh networks are possible. In such a configuration, some embodiments may utilize one or more wireless modules 104-1 positioned on the user's 102-1 head as the hub that serves to connect the various other wireless modules 104-1, 104-2, 104-3. This arrangement may be advantageous in ensuring that the various wireless modules 104-1, 104-2, 104-3 have a relatively unobstructed data link. For example, the wireless module 104-1 on the user's head may have a direct line of sight connection with each of the wireless modules 104-2, 104-3 on the user's chest and back, while the wireless modules 104-2, 104-3 on the chest and back are obstructed from one another by the user's torso.

Once the personal area network has been established between the various wireless modules 104-1, 104-2, 104-3, the wireless modules 104-1, 104-2, 104-3 may perform additional checks to ensure that the personal area network is established between only wireless modules 104-1, 104-2, 104-3 that are on the same body. This may involve the wireless modules 104-1, 104-2, 104-3 periodically polling for movement of nearby modules to correlate movements. For example, it is possible that the one or more wireless modules 104-1, 104-2, 104-3 on the user 102-1 did not get associated with the network initially due to slight movement mismatches (possibly due to a user's irregular gait, etc.). These wireless modules 104-1, 104-2, 104-3 may be later associated with the network if later determined to have movements that match that of the wireless modules 104-1, 104-2, 104-3 in the network. Similarly, one or more wireless modules 104-1, 104-2, 104-3 that were initially associated with the network may be removed if it is determined that such wireless modules 104-1, 104-2, 104-3 are no longer (or possibly never were) affixed to the user 102-1. For example, if a number of users are soldiers in parade formation, the direction, timing, style, etc. of their movements may be very similar. In such instances, false positives may occur that can be later corrected by continued correlation of further movements.

Additionally, in some embodiments, the wireless modules 104-1, 104-2, 104-3 may filter out possible wireless modules 104-4, 104-5, 104-6 for association. Precision ranging or signal strength may be used for the association. For example, using RSSI or other signal strength or distance indicator, a first wireless module 104-1 may determine that a second wireless module 104-2 is as being too distant to be present on a same user 102-1 as the first wireless module 104-1. The first wireless module 104-1 may then exclude the second wireless module 104-2 from its movement correlation process and prevent the second wireless module 104-2 from being associated with the network of the first wireless module 104-1.

Figure 3:
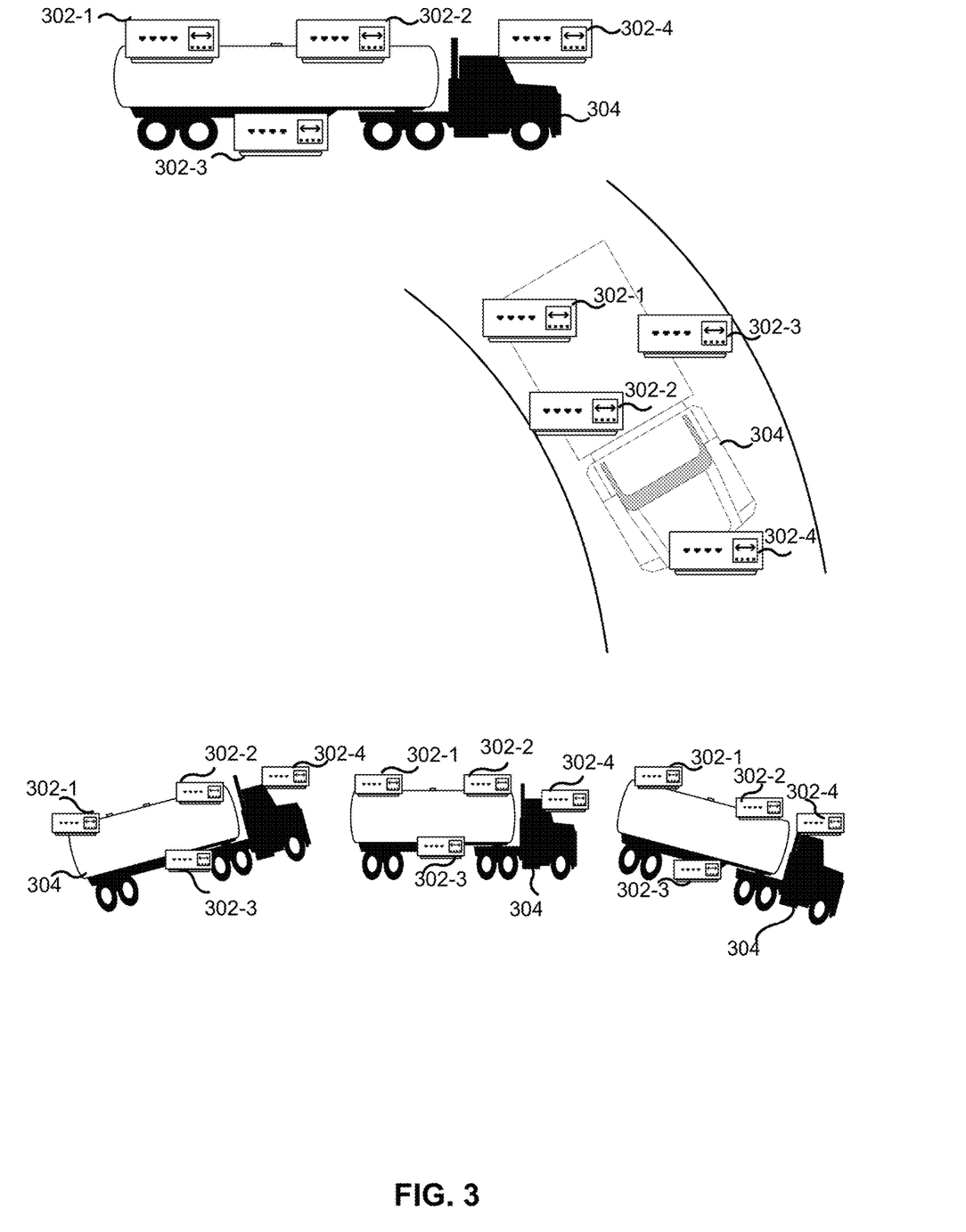
FIG. 3 depicts an embodiment of an application area of the automatic association system.

Referring next to FIG. 3, an embodiment of an application area of the automatic association system 100 are illustrated. Other embodiments may also include vehicles, such as watercraft, aircraft, and/or land vehicles. Association of training simulation instrument is another area of application. For example, a number of wireless modules 302-1, 302-2, 302-3, and 302-4 may be affixed to a vehicle 304 at various positions of the vehicle 304. Each wireless modules 302-1, 302-2, 302-3, and 302-4 may include the IMU that provides various data, such as acceleration, gyroscopic measurements, pressure (which may indicate a height of the wireless modules 302-1, 302-2, 302-3, and 302-4), heading (from a digital compass/magnetometer of the IMU), etc. to the wireless module 302-1, 302-2, 302-3, and 302-4. The movement detected by the IMU allows each wireless module 302-1, 302-2, 302-3, and 302-4 to initialize a personal area network with other wireless modules 302-1, 302-2, 302-3, and 302-4 on the vehicle 304.

Additionally, the movement data allows the wireless modules 302-1, 302-2, 302-3, and 302-4 to be automatically assigned with a location and/or function. This may be particularly useful in combat training exercises in which a simulation of a projectile hitting an area of the vehicle 304 positioned atop a fuel tank may have different results than the projectile hitting another area of the vehicle 304. The determination of location is based on movement data in several ways. For example, as the vehicle 304 accelerates forward the front of the vehicle 304 lifts and then settles, while the rear of the vehicle 304 declines and then rises. Based on the movement, each wireless module 302-1, 302-2, 302-3, and 302-4 may determine whether it is near the front, middle, or rear of the vehicle 304. Additionally, using pressure measurements, a height of each wireless module 302-1, 302-2, 302-3, and 302-4 may be determined. Similarly, as the vehicle 304 brakes or otherwise decelerates there is downward movement at the front and upward movement at the back of the vehicle 304. Similar determinations may be made from turning of the vehicle 304. Such location-determining steps help eliminate the need for human setup of the wireless modules 302-1, 302-2, 302-3, and 302-4 beyond affixing the wireless modules 302-1, 302-2, 302-3, and 302-4 to the vehicle 304. No other manual initiation steps are necessary, thus saving time and reducing errors, especially due to the self-healing nature of the personal area network by continued periodic polling for movement correlations of nearby wireless modules 302-1, 302-2, 302-3, and 302-4.

A number of association rules identify phases of activity, separates logistical movement of equipment from similar movements and usage phase where automatic association is employed. The association rules to differentiate these phases would include:

Density of wireless modules—large number of wireless modules in transit cases on back of a truck will be determined as a logistical activity for example, too many wireless modules in number or too close to each other, from a training use case. Smaller number of wireless modules or distributed distances between each other is another training use case.

Master module having knowledge of exercise mode—Time (a reprogrammed start time).

Communications to a remote control station, where the remote control station being active indicates exercise use.

Figure 4:
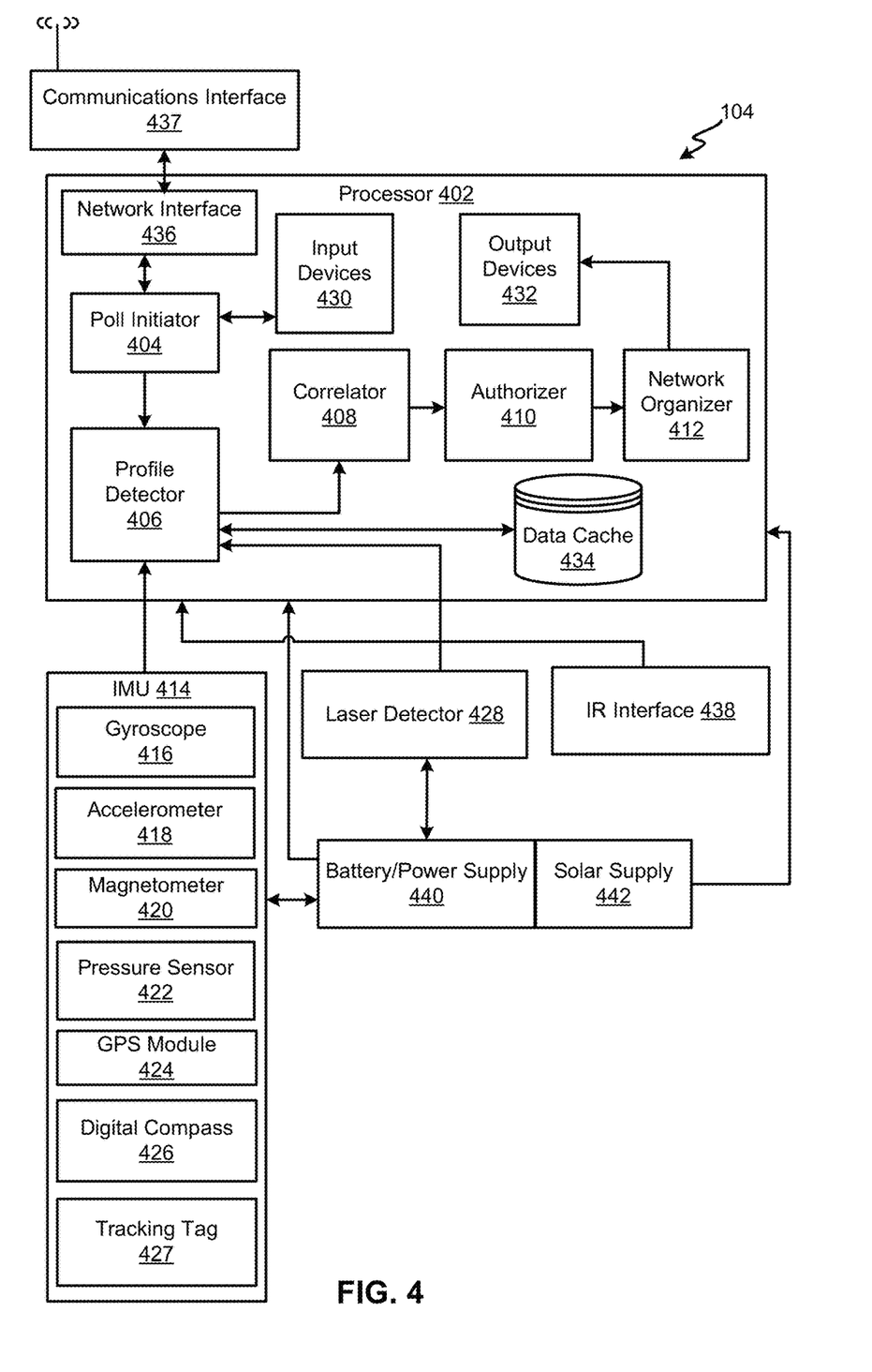
FIG. 4 depicts a block diagram of a wireless module(s) of the automatic association system.

Referring next to FIG. 4, a block diagram of a wireless module(s) 104 of the automatic association system 100 is illustrated. The wireless module 104 is attached to a part of a platform that may include other similar wireless modules 104. The platform may be a human body, a vehicle such as a truck, bus, transit system, warship, etc. The wireless module 104 is configured to identify movements of the wireless module 104 and correlate the movements with the movements of other wireless modules 104 and the platform on which it is attached. The wireless module 104 includes a processor 402, an inertial measurement unit (IMU) 414, a laser detector 428, an Infrared radiation (IR) interface 438, a communication interface 437, a battery/power supply 440, and a solar supply 442.

The processor 402 controls poll initiation, profile detection, correlation, and authorization. The processor 402 may include one or more processors, such as one or more special-purpose processors (such as digital signal processing chips, graphics acceleration processors, and/or the like), one or more input devices 430, and one or more output devices 432. The processor 402 includes a data cache 434 that may include instructions and/or rules that are used by the processor 402 to establish personal area networks. For example, the data cache 434 may include gait information and/or other movement information such as vehicle acceleration, orientation, deceleration, and/or turning profiles that allow the processor 402 to properly determine whether a set of one or more other wireless modules 104 are attached to a same body or platform. The processor 402 further includes a poll initiator 404, a profile detector 406, a correlator 408, an authorizer 410, a network organizer 412, and a network interface 436.

The poll initiator 404 performs a search for the wireless modules 104. The poll initiator 404 performs a network polling mode of the wireless module 104. The network polling mode is initiated using the network interface 436. In an embodiment, the network polling includes the wireless module 104 detecting a light source, such as a modulated laser.

The network interface 436 is a communication interface, which can include without limitation a modem, a network card (wireless or wired), an infrared communication device, a wireless communication interface and/or chipset, and/or similar communication interfaces. The network interface 436 may permit data (such as movement data) to be exchanged with a network, other computer systems, and/or any other devices. The network interface 436 may also be used to establish and communicate via the PANs.

The network interface 436 in the field communicates using the communications interface 437. Wireless protocols include Bluetooth™, IEEE 802.15.4, Zigbee, IEEE 802.11 (Wi-Fi), IEEE 802.16 (WiMAX), near-field communication (NFC), cellular, other short-range communications, etc.

The IR interface 438 is a communications interface, which includes an infrared communication using for example Infrared Data Association (IrDA) protocols. The IR interface 438 is particularly provided for the infrared communication media. The IR interface 438 provides the infrared communication in the PAN or with devices seeking adoption.

The battery/power supply 440 provides power to the components of the wireless module 104 such as the processor 402, the laser detector 428, and the IMU 414. The battery/power supply 440 includes physical battery, and subsequent power supply. In some configurations, the wireless module 104 is hardwired to the platform to avoid need for a battery.

The solar supply 442 is energy harvesting component of the wireless module 104. The solar supply 442 is used to provide solar energy or other renewable source of energy to the processor 402, the laser detector 428, and the IMU 414 as an alternative source of energy. Where solar is not currently available, the battery can provide power perhaps charged earlier with solar.

The profile detector 406 determines device profile of the wireless modules 104. The device profile includes two or more of an orientation of the device, the movement, acceleration, and timing associated with the wireless modules 104. The profile detector 406 also determines profiles such as movement, orientation, acceleration, and timing profiles of the platform on which the wireless module 104 is attached to or associated with. The profiles also include pressure profile or gait information associated with the platform.

The IMU 414 determines movement of the detected wireless module 104. The IMU 414 provides the processor 402 with movement data associated with the wireless module 104. For example, the IMU 414 may include a gyroscope 416, accelerometer 418, magnetometer 420, pressure sensor 422, GPS module 424, a digital compass 426, tracking tag 427, and/or other sensors. The tracking tag 427 uses ultra wide band or other technologies to determine location where a GPS module 424 may not function. The IMU 414 may provide information from these sensors to the processor 402 such that the processor 402 may identify other wireless modules 104 having similar movement profiles. The processor 402 may then determine that these wireless modules 104 are on a same platform and may establish a personal area network with the various wireless modules 104.

The wireless module 104 may not include a GPS module 424 in the IMU 414. Where the GPS module 424 is missing, non-functional or powered down, the location of the wireless module 104 can determine its location inferentially from another wireless module 104 on the same platform and PAN and nearby. The separation can be corrected for by the processor 402. Between synchronizations or when separated, dead reckoning can be used, for example when the wireless module 104 falls from the platform. Dead reckoning can be calculated by the processor 402 using readings from the gyroscope 416, accelerometer 418, magnetometer 420, and/or digital compass 426.

The correlator 408 receives the movement of the detected wireless modules 104 and other wireless modules 104. The correlator 408 compares the movement of the wireless modules 104 and other wireless modules 104. Based on the comparison of the movement of the wireless modules 104, the correlator 408 further compares the device profile of the detected wireless module 104 with the profiles of the platform on which the wireless module 104 is attached to or associated with. The profiles include movement over time profile, acceleration profile, pressure profile and/or gait information associated with the platform. The correlation is provided to the authorizer 410 for processing.

The authorizer 410 validates the detected wireless module 104 for connecting with the other wireless modules 104 in a network based on the correlation. When it is determined that the detected wireless module 104 is placed on the same platform and is in correlation with the other wireless modules 104, then the detected wireless module 104 is authorized for connection. The authorization is necessary for the wireless modules 104 to connect.

The network organizer 412 establishes a PAN based on the authorization. The network organizer 412 establishes a network when the detected wireless module 104 correlates with the other wireless modules 104 and associated with the same platform.

The wireless module 104 includes the laser detector 428 configured to detect a particular wavelength of light associated with an object such that the laser detector 428 may determine when the wireless module 104 has been hit by the object. US MILES is one of a number of protocols that may be received.

Additional components of the wireless module 104 include a laser transmitter (not shown) with US MILES being one of a number of protocols that may be transmitted. Inclusion of the laser transmitter in the communication interface 437 gives bidirectional laser communication capability to the wireless module 104. The wireless module 104 may also include a precision orientation module (not shown) which senses weapon orientation, as next generation replacement for laser. Inclusion of the precision orientation module makes the wireless module a weapon simulator.

Figure 5:
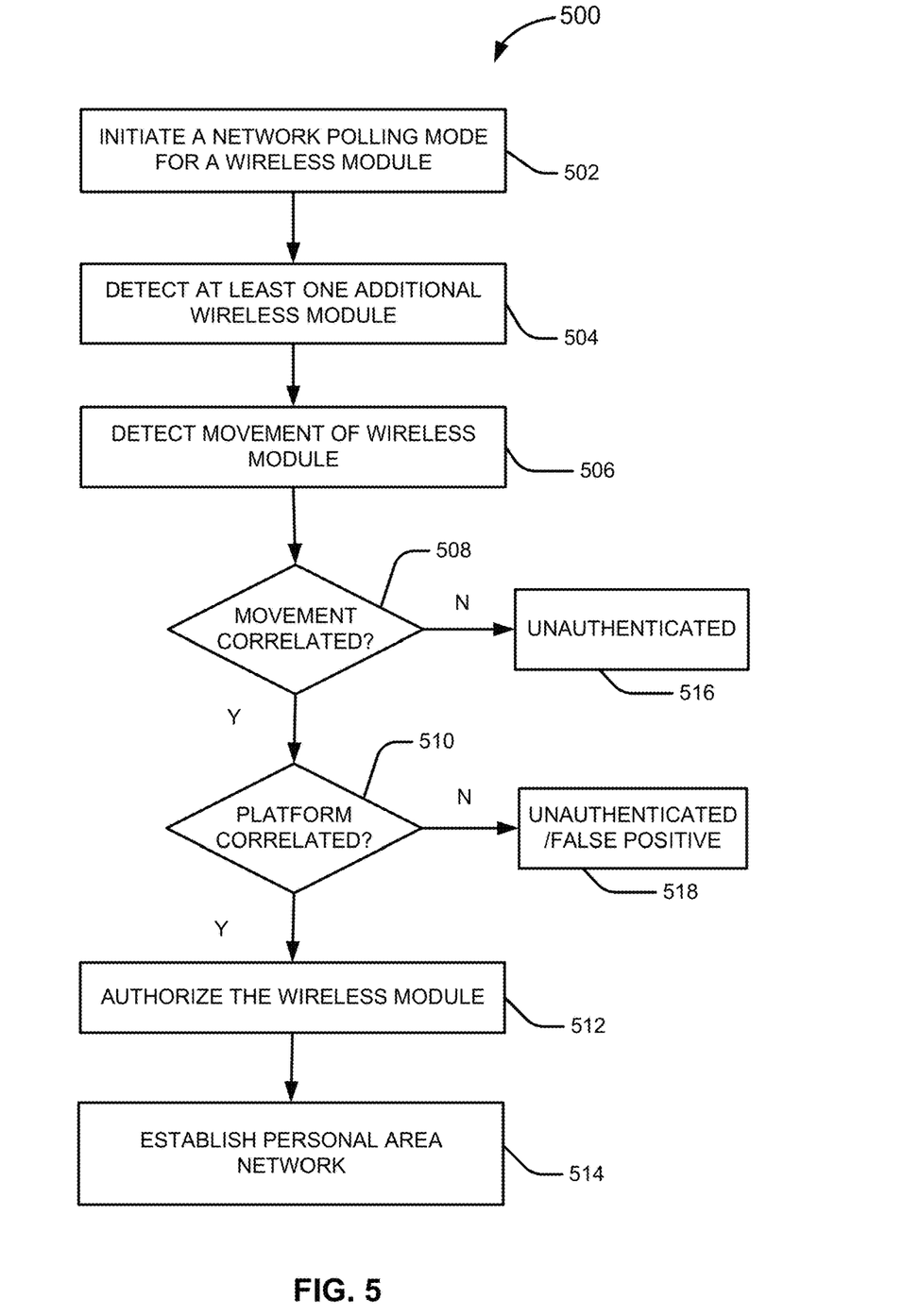
FIG. 5 illustrates a flowchart of an association process for establishing a connection between a wireless module and other wireless modules based on authorization.

FIG. 5 illustrates a flowchart of an association process 500 for establishing a connection between a wireless module 104-1 and other wireless modules 104-2, 104-3 based on authorization, according to an embodiment of the present disclosure. For establishing an automatic association between a number of wireless modules 104-1, 104-2, 104-3, detection of the wireless modules 104-2, 104-3, correlation with the wireless modules 104-2, 104-3 and authorization of the wireless module 104-1 based on the correlation is performed. The depicted portion of the association process 500 starts at block 502 where a network polling for the wireless module 104-1 is initiated. A number of wireless modules 104-2, 104-3 within a predetermined distance from the wireless module 104-1 are identified.

At block 504, based on the network polling, at least one additional wireless module 104-2, 104-3 is identified. The at least one additional wireless module 104-2, 104-3 being other than the wireless module 104-1. The wireless modules 104-1, 104-2, 104-3 are attached on a same platform which needs to be identified based on the correlation of movements of the wireless modules 104-1, 104-2, 104-3.

At block 506, movements of the wireless modules 104-1, 104-2, 104-3 are identified. The movements are identified for correlation in order to identify association between the wireless modules 104-1, 104-2, 104-3. The movements correspond with the location, orientation, pressure (height) and timing of the wireless modules 104-1, 104-2, 104-3 on the platform.

At block 508, the correlation between the wireless module 104-1, and the wireless modules 104-2, 104-3 is identified. If there is a correlation between the wireless module 104-1, and the wireless modules 104-2, 104-3, then the correlation with the platform is identified at block 510. Else if there is no correlation between the wireless module 104-1 and the wireless modules 104-2, 104-3, then the and the wireless modules 104-1 is unauthenticated at block 516.

At block 510, the correlation of the wireless module 104-1 with the profiles of the platform is identified. For example, the wireless module 104-1 may be placed on a human body. Then the wireless module 104-1 is correlated with a location of placement on the human body along with the other wireless modules 104-2, 104-3. If it is determined that the wireless 104-1 and the other wireless modules 104-2, 104-3 are on the same platform then, at block 512, the wireless module 104-1 is authorized for connection with the other wireless modules 104-2, 104-3 else at block 518, the wireless module 104-1 is unauthorized and the correlation is considered a false positive.

At block 514, based on the authorization of the wireless module 104-1, the personal area network is established between the wireless modules 104-1, 104-2, and 104-3. The wireless module 104-1 starts communicating with the other wireless modules 104-2 and 104-3 and an association between the wireless modules 104-1, 104-2, and 104-3 is established.

The network polling continues to identify wireless modules 104. The determination of whether the personal area network includes wireless modules 104-4, 104-5, and 104-6 that are not on the platform enables the personal area network to be re-established to include the wireless modules 104-1, 104-2, and 104-3 that are determined to be on the platform.

Figure 6:
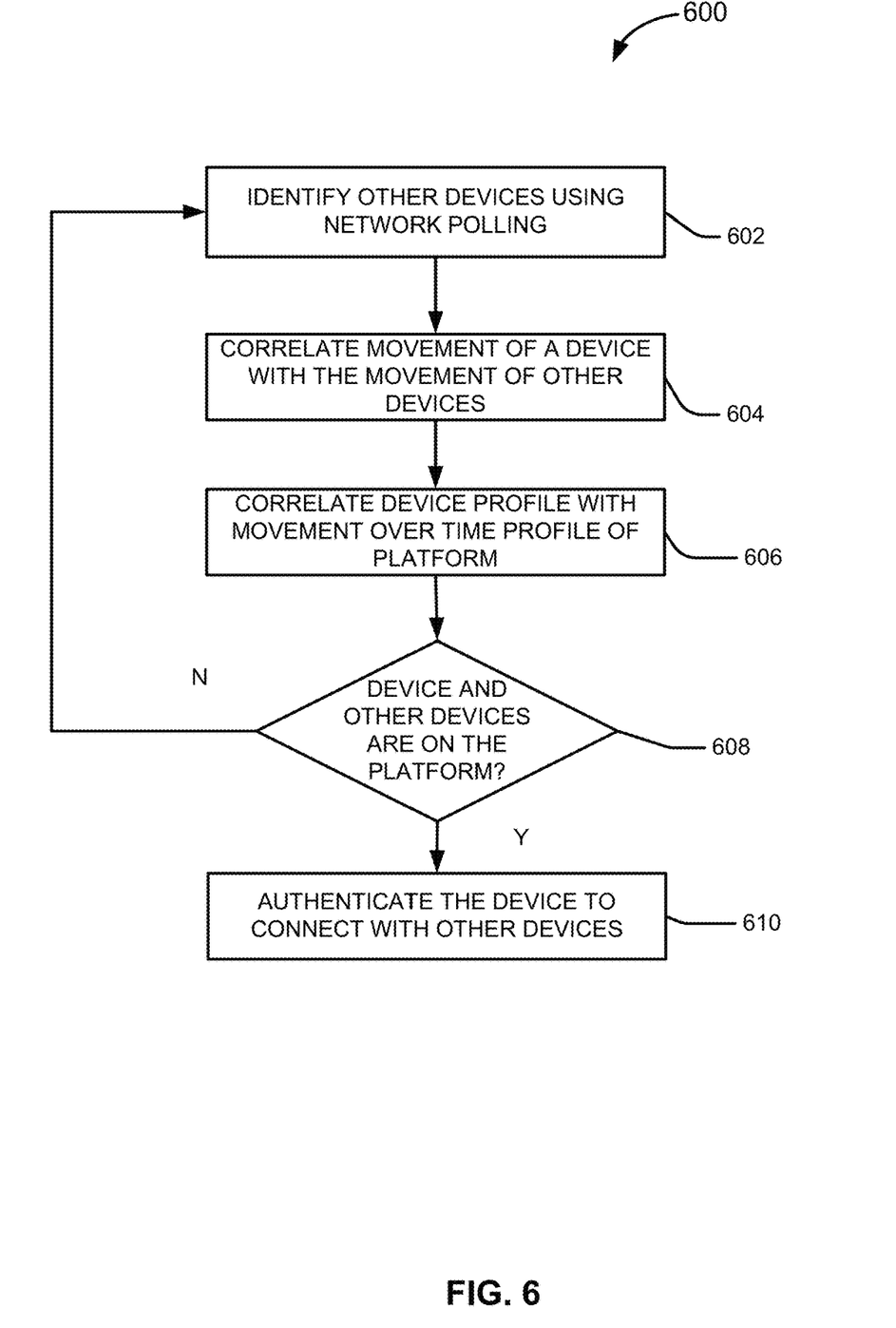
FIG. 6 illustrates a flowchart of a correlation process for identifying whether a device and at least one other device are located on a platform.

FIG. 6 illustrates a correlation process 600 for identifying whether a device and at least one other device are located on a platform, according to an embodiment of the present disclosure. The depicted portion of the correlation process 600 starts at block 602 where a network polling of a device is initiated to search for at least one other device. A plurality of other devices may be identified using the network polling.

At block 604, movements of the device and the plurality of other devices is identified and correlated with each other. The correlation of the movement of the device and the movement of the plurality of other devices is used to identify whether the device and the plurality of other devices are in a predetermined distance and attached on a common platform.

At block 606, a device profile is correlated with a movement over time profile of a platform. The device profile includes two or more of an orientation of the device, location, movement, acceleration, and timing associated with the device. The movement over time profile of a platform includes movements associated with the platform over a period of time. Based on the correlation of the device profile and the movement over time profile, it is determined that the device is attached on the platform. The device profiles of the plurality of other devices may also be correlated with the movement over time profile of the platform. This correlation confirms whether the plurality of other devices are attached on the common platform.

At block 608, it is determined whether the device and the plurality of other devices are attached or located on the common platform. If the device and the plurality of other devices are on the common platform, then at block 610, the authentication is provided to the device, else the control returns to block 602, where the network polling searches for other devices.

At block 610, the device is authenticated to connect with the plurality of other devices being located on the common platform. The authentication is provided as a validation of the correlation and providing a grant to the device and the plurality of other devices to establish a personal area network.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method of automating an association of a plurality of devices in a battlefield simulation system, comprising:
   providing the plurality of devices on a platform;
   initiating a network polling mode of each of the plurality of devices;
   detecting, using each of the plurality of devices, at least one other of the plurality of devices;
   detecting, using a device of the plurality of devices, a movement of the device and the at least one other of the plurality of devices;
   correlating the movement of the device to the movement of the at least one other of the plurality of devices;
   determining that a device profile associated with the device correlates with a movement over time profile of the platform;
   determining, by the device, that the device and the at least one other of the plurality of devices are on the platform based on the movement and the correlation of the device profile with the movement over time profile;
   authenticating the device based on the determination; and
   establishing a personal area network between the device and the at least one other of the plurality of devices based on the authentication and determination that the device and the at least one other of the plurality of devices are on the platform.

2. The method of automating an association of a plurality of devices in a battlefield simulation system as recited in claim 1, wherein:
   the platform comprises a vehicle; and
   the movement comprises one or both of an acceleration or a deceleration.

3. The method of automating an association of a plurality of devices in a battlefield simulation system as recited in claim 1, further comprising:
   determining that the personal area network includes one or more devices that are not on the platform; and
   re-establishing the personal area network to include devices that are determined to be on the platform.

4. The method of automating an association of a plurality of devices in a battlefield simulation system as recited in claim 1, wherein:

the platform comprises a human body; and
the determination that the device and the at least one other of the plurality of devices are on the platform is based on the correlation.

5. The method of automating an association of a plurality of devices in a battlefield simulation system as recited in claim 1, wherein the personal area network comprises a hub and spoke network or a mesh network.

6. The method of automating an association of a plurality of devices in a battlefield simulation system as recited in claim 1, wherein the device profile comprises two or more of an orientation of the device, the movement, acceleration, and timing associated with the device.

7. The method of automating an association of a plurality of devices in a battlefield simulation system as recited in claim 1, further comprising:
initiating the network polling mode of each of the plurality of devices comprises at least one of the plurality of devices detecting a light source.

8. An automatic association system for connecting a plurality of devices in a network of a battlefield simulation environment, comprising:
the plurality of devices, wherein each of the plurality of devices comprises:
an inertial measurement unit;
a network interface; and
a processor configured to:
initiate, using the network interface, a network polling mode of a device of the plurality of devices;
detect, using the network interface of the device, at least one other device of the plurality of devices;
detect, using the inertial measurement unit a movement of the device;
correlate the movement of the device to a movement of the at least one other of the plurality of devices;
determine that a device profile associated with the device correlates with a movement over time profile of a platform;
authenticate the device based on the determination; and
establish, using the network interface, a personal area network between the device and the at least one other of the plurality of devices based on the authentication of the device.

9. The automatic association system for connecting a plurality of devices in a network of a battlefield simulation environment as recited in claim 8, wherein the personal area network between the device and the at least one other of the plurality of devices is established based on the determination that the device and the at least one other of the plurality of devices are associated with the platform.

10. The automatic association system for connecting a plurality of devices in a network of a battlefield simulation environment as recited in claim 8, wherein the inertial measurement unit comprises one or more of an accelerometer, a gyroscope, a magnetometer, or a pressure sensor.

11. The automatic association system for connecting a plurality of devices in a network of a battlefield simulation environment as recited in claim 8, wherein the platform is a body on which the plurality of devices are attached.

12. The automatic association system for connecting a plurality of devices in a network of a battlefield simulation environment as recited in claim 8, wherein the platform is a vehicle on which the plurality of devices are attached.

13. The automatic association system for connecting a plurality of devices in a network of a battlefield simulation environment as recited in claim 8, wherein the network polling includes searching for the plurality of devices using a received signal strength indicator (RSSI) or precision ranging, Bluetooth, Bluetooth Low Energy (BLE), ZigBee, and/or infrared signals.

14. The automatic association system for connecting a plurality of devices in a network of a battlefield simulation environment as recited in claim 8, wherein the device profile comprises two or more of an orientation of the device, the movement, acceleration, and timing associated with the device.

15. A non-transitory computer-readable medium having instructions stored thereon, wherein the instructions, when executed by one or more processors of an automatic association system, cause the automatic association system to perform by the one or more processors configured to:
provide a plurality of devices on a platform;
initiate a network polling mode of each of the plurality of devices;
detect, using each of the plurality of devices, at least one other of the plurality of devices;
detect, using a device of the plurality of devices, a movement of the device and a movement of the at least one other of the plurality of devices;
correlate the movement of the device to the movement of the at least one other of the plurality of devices;
determine that a device profile associated with the device correlates with a movement over time profile of the platform;
authenticate the device based on the determination; and
establish a personal area network between the device and the at least one other of the plurality of devices based on the authentication.

16. The non-transitory computer-readable medium of claim 15, wherein the
the platform comprises a vehicle; and
the movement comprises one or both of an acceleration or a deceleration.

17. The non-transitory computer-readable medium of claim 15, wherein the device profile comprises two or more of an orientation of the device, the movement, acceleration, and timing associated with the device.

18. The non-transitory computer-readable medium of claim 15, wherein the personal area network between the device and the at least one other of the plurality of devices is established based on the determination that the device and the at least one other of the plurality of devices are associated with the platform.

19. The non-transitory computer-readable medium of claim 15, wherein the platform comprises a human body.

20. The non-transitory computer-readable medium of claim 15, wherein the network polling includes searching for the plurality of devices using a received signal strength indicator (RSSI) or precision ranging, Bluetooth, Bluetooth low energy (BLE), ZigBee, and/or infrared signals.

* * * * *